US007693902B2

(12) United States Patent
Kim et al.

(10) Patent No.: US 7,693,902 B2
(45) Date of Patent: Apr. 6, 2010

(54) ENABLING CLUSTERED SEARCH PROCESSING VIA TEXT MESSAGING

(75) Inventors: Ben Kim, Sunnyvale, CA (US); Tong Zhu, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 305 days.

(21) Appl. No.: 11/833,173

(22) Filed: Aug. 2, 2007

(65) Prior Publication Data

US 2008/0275864 A1 Nov. 6, 2008

Related U.S. Application Data

(60) Provisional application No. 60/915,639, filed on May 2, 2007.

(51) Int. Cl.
*G06F 17/30* (2006.01)
(52) U.S. Cl. .................................. 707/731
(58) Field of Classification Search ............. 707/2, 707/5, 731; 455/418
See application file for complete search history.

(56) References Cited

U.S. PATENT DOCUMENTS

| | | | |
|---|---|---|---|
| 6,460,036 B1 | 10/2002 | Herz | |
| 6,922,699 B2 | 7/2005 | Schuetze et al. | |
| 7,082,426 B2 | 7/2006 | Musgrove et al. | |
| 2005/0174975 A1 | 8/2005 | Mgrdechian et al. | |
| 2007/0060114 A1* | 3/2007 | Ramer et al. | 455/418 |

FOREIGN PATENT DOCUMENTS

WO 2005/114970 A2 12/2005

OTHER PUBLICATIONS

Federated search, http://en.wikipeda.org/wiki/Federated_search (last visited May 15, 2007) (3 pages).
Crowley, Dennis P. et al., U.S. Appl. No. 60/570,410, filed May 12, 2004 entitled "Location-Based Social Software for Mobile Devices", (18 pages).
Dudley, Brier: "What has the iPod looking over its shoulder . . . and other tech predictions for the new year," The Seattle Times, pp. 1-4, Jan. 1, 2007.
Zamir, O. et al. "Grouper: A Dynamic Clustering Interface to Web Search Results." WWW8, International World Wide Web Conference, Nov. 5, 1999.

* cited by examiner

*Primary Examiner*—Etienne P LeRoux
(74) *Attorney, Agent, or Firm*—Darby & Darby P.C.; John W. Branch

(57) ABSTRACT

Methods and apparatus for searching data, grouping search results into categories that are ordered according to search relevance, and reviewing the search results via text messaging. In one embodiment, a search term is submitted via a search request text message to a short code for a search service. The search service searches for content based on the search term and context data, such as location of a submitting client device. The search results are clustered into categories and ranked by relevance to the search term and context within each category. The categories are also ranked relative to each other. The most relevant search result from the most relevant category is transmitted in an initial result text message, which also includes instructions to access additional results via subsequent text messages. Each result text message also includes a link to a web page of categorized search results for display in a browser.

20 Claims, 6 Drawing Sheets

ENABLING CLUSTERED SEARCH PROCESSING VIA TEXT MESSAGING

CROSS-REFERENCE TO RELATED APPLICATIONS

This utility patent application claims priority to U.S. Provisional Patent Application No. 60/915,639, filed on May 2, 2007, entitled "Enabling Clustered Search Processing Via Text Messaging," the benefit of which is claimed under 35 U.S.C. §119, and the entire contents of which are further incorporated herein by reference.

FIELD OF ART

The present invention relates generally to searching data and, more particularly, but not exclusively to grouping search results into categories for review via a text messaging system according to search relevance.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, businesses, or the like.

However, performing a search query for user relevant information still remains cumbrous. Often, the user might have to perform several search queries to obtain relevant search results. Irrelevant search results mean that the user is less likely to find what they are looking for, which in turn may translate into lost opportunities for merchants, or other businesses, to prosper from the user. Therefore, many businesses are searching for new ways to make search results more relevant to the user. One technique is to group search results that match submitted search terms. Some search systems provide predefined groups of data types for search results, such as web pages, images, videos, local results, shopping related results, jobs, news, advertisements, and the like. The groups are typically arranged in the same order and each group typically includes only one data type.

Another technique is to determine groups based on textual similarity of the search results. However, textually similar groups generally do not take into account any information about the searcher. Consequently, the groups that are determined by textual similarity may not be the most relevant groups to the searcher. Similarly, a ranking of textually similar groups may not be in an order that is most relevant to the searcher. Current grouping systems also generally provide only brief summary information and links to the search results. A returned search results page generally does not include any substantive content that stands alone without links based on the search terms.

Search results are also difficult for users to obtain and/or evaluate with electronic devices that have limited data input, output, and/or communication capabilities. For example, some cell phones have a limited keypad, a small screen, and/or text messaging capabilities. Such devices may be limited to processing short text messages, such as Short Message Service (SMS) messages. Even with more capable devices, it is typically time-consuming for a user to manually open a browser, navigate to a search service, submit search terms, and navigate forward and backward through the listed search results. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Illustrative Operating Environment

Figure 1:
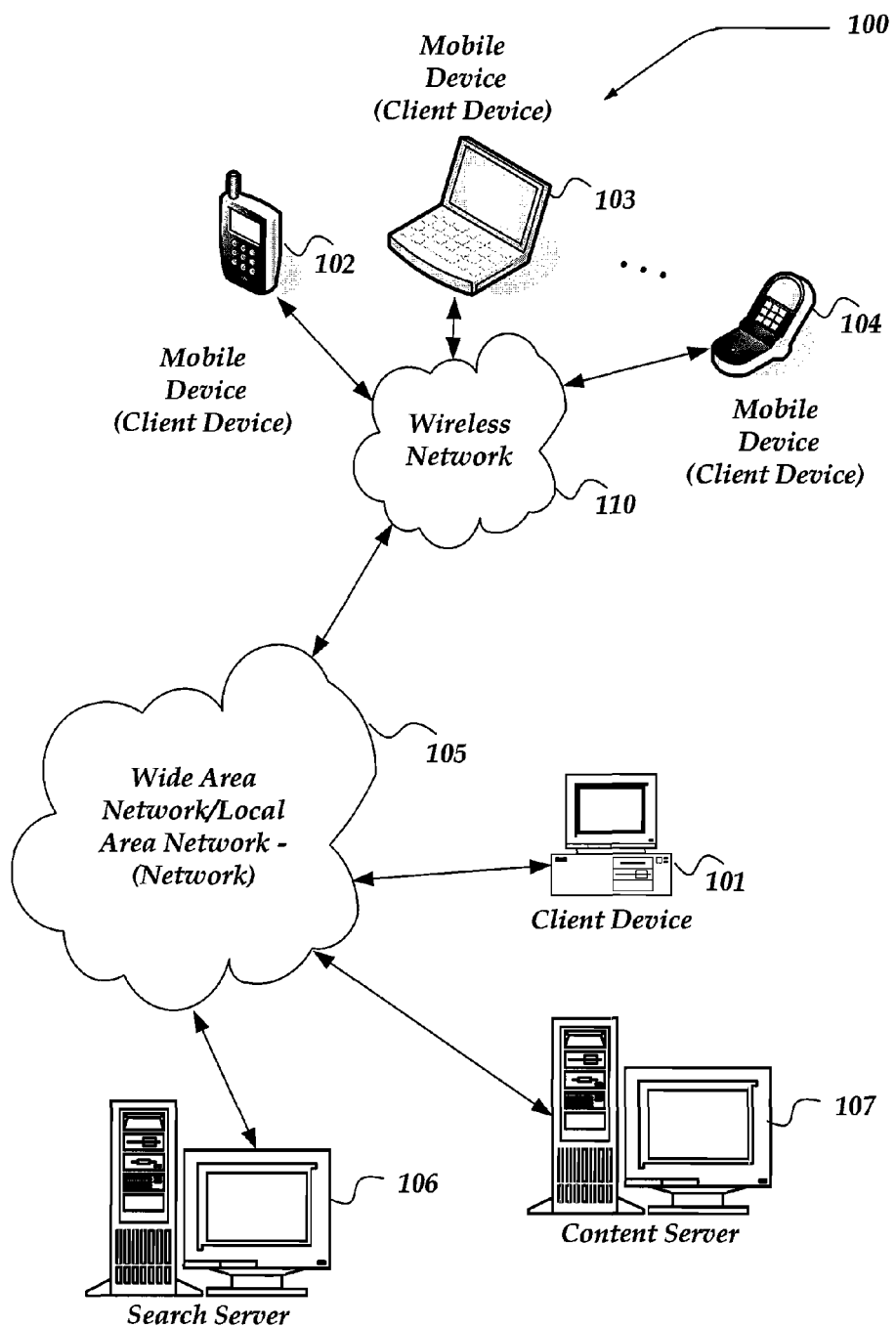
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes networks that enable communication between client and server devices. A network 105 may comprise one or more local area networks ("LANs") and/or wide area networks ("WANs"). A wireless network 110 may comprise LANs, WANs, telephony networks, or the like. System 100 also includes a general purpose client device 101, mobile client devices 102-104, a search server 106, and content server 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. Such mobile devices may include a messaging client that enables a user to send and receive limited size text messages, but may not enable a user to send or receive long messages, graphics, images, or other content.

In another example, a web-enabled mobile device may have a touch sensitive screen, a stylus, and several lines of color LCD display in which both text and graphics may be displayed. A web-enabled mobile device may include a messaging client and a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the mobile device may employ the browser application to exchange text messages that include search queries and search results. A user may also employ a browser application to access additional search result content that is identified in one or more text messages.

Mobile devices 102-104 also may include at least one client application that is configured to provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to search server 106, client device 101, or other computing devices.

In one embodiment, mobile devices 102-104 may also provide a physical location to another computing device. In one embodiment, however, mobile devices 102-104 may provide the physical location information in terms of a latitude and longitude, or the like. However, mobile devices 102-104 may also provide other information that may be employed to determine a physical location of the device, including for example, a cell tower address, a MAC address, IP address, or the like.

Mobile devices 102-104 may further be configured to include a client application that enables the end-user to log into an end-user account that may be managed by another computing device, such as search server 106. Such end-user account, for example, may be configured to enable the end-user to send/receive SMS messages, IM messages, emails, access selected web pages, participate in a social networking activity, perform search queries, or the like. However, performing search queries, participation in various social networking activities, or the like, may also be performed without logging into the end-user account.

Client device 101 may include virtually any computing device capable of communicating over a network to send and receive information, including search query information, location information, social networking information, or the like. The set of such devices may include devices that typically connect using a wired or wireless communications medium such as personal computers, multiprocessor systems, microprocessor-based or programmable consumer electronics, network PCs, or the like. Client device 101 may include a messaging system and/or interface for sending or receiving text messages with mobile devices 102-104 or other client devices.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include cellular networks, mesh networks, Wireless LAN (WLAN) networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies voice or data communications, including data communications that only allow text messaging. Technologies may also include 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple search server 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between search server 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of search server 106 is described in more detail below in conjunction with FIG. 3. Briefly, however, search server 106 may include any computing device capable of connecting to network 105 to enable data searching, filtering, sorting, and other data management operations. Search server 106 may also provide network portal information and/or services, including providing content and tracking users online behavior with their permission. Search server 106 may further enable aggregation and management of social networking information. Devices that may operate as search server 106 include personal computers desktop computers, multiprocessor systems, microprocessor-based or programmable consumer electronics, network PCs, servers, and the like.

Although FIG. 1 illustrates search server 106 as a single computing device, the invention is not so limited. For example, one or more functions of search server 106 may be distributed across one or more distinct computing devices. For example, managing searches, search results, SMS messages, Instant Messaging (IM) sessions, email messages, sharing of contact information, collecting behavior information, aggregating and/or storing of social networking information, or the like, may be performed by a plurality of computing devices, without departing from the scope or spirit of the present invention.

Content server 107 represents a variety of content and/or other data that may useable on mobile devices 102-104 and/or on client 101. Such content may include text content, web content, audio content, video content, FTP data, or the like. Data services may include, but are not limited to SMS, IM services, email services, services, web services, third-party services, audio services, video services, VOIP services, calendaring services, photo services, or the like. Moreover, information about the content and/or services provided by content server 107 may be employed to provide results to a search query.

Devices that may operate as content server 107 include personal computers desktop computers, multiprocessor systems, microprocessor-based or programmable consumer electronics, network PCs, servers, and the like.

Illustrative Mobile Client Environment

Figure 2:
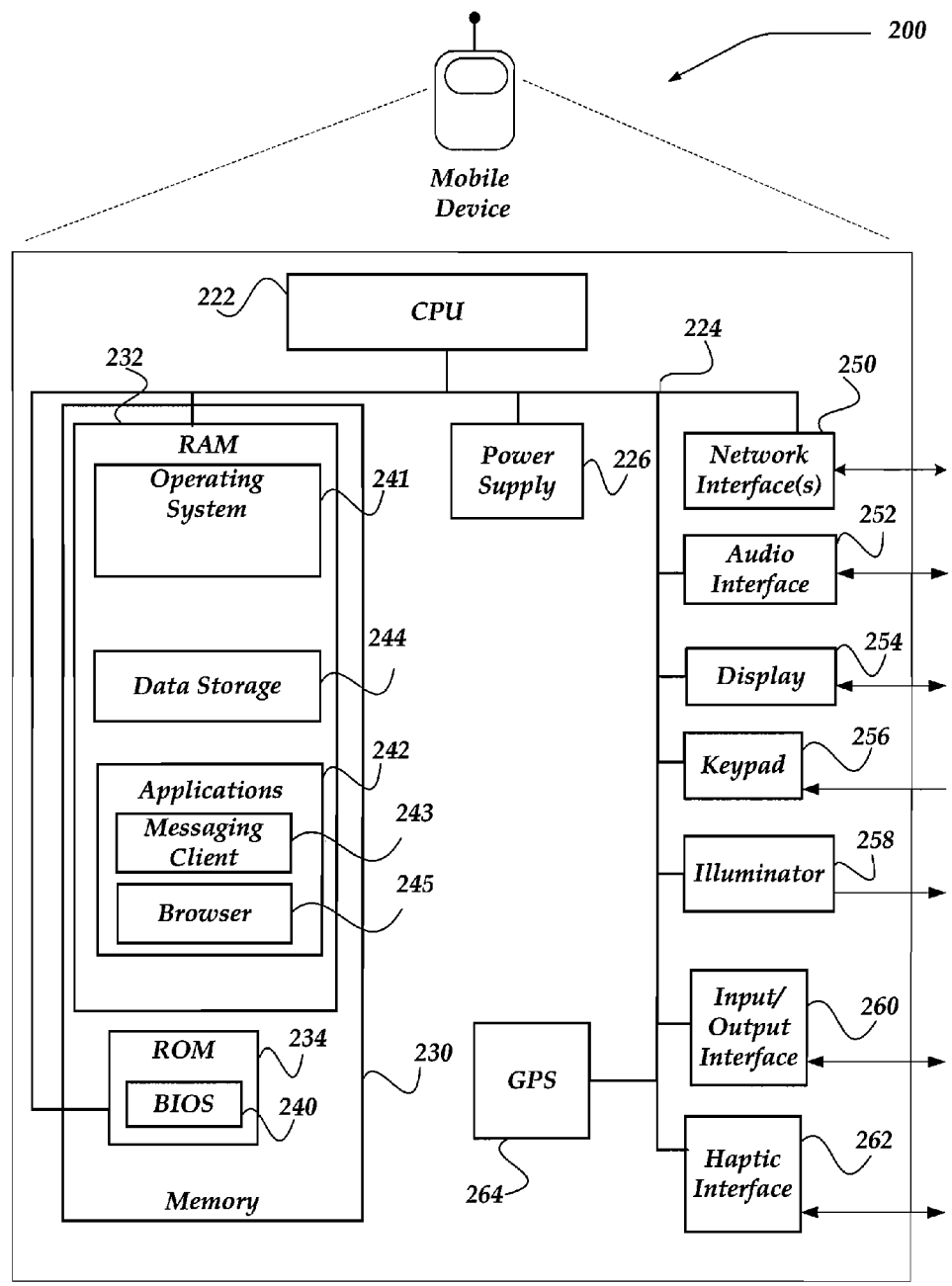
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one embodiment of at least one of mobile devices 102-104 of FIG. 1.

As shown in the figure, mobile device 200 includes a central processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), GPRS, SMS, WAP, user datagram protocol (UDP), transmission control protocol/Internet protocol (TCP/IP), general packet radio service, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial pad. Keypad 256 may also include a keyboard or command buttons that are associated with taking and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions. In another embodiment, illuminator 258 may comprise a flash for a built-in camera (not shown).

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS) or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, the mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory may also store an operating system 241 for controlling other operations of mobile device 200. It will be appreciated that this component may include a specialized client communication operating system such as Windows Mobile™, or the Symbian® operating system, or a general purpose operating system such as a version of UNIX, or LINUX™. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a message or part of a header during a communication, sent upon request, or the like. Moreover, data storage 244 may also be employed to store search data, user preferences, address books, buddy lists, aliases, social networking information, or the like. At least a portion of the information may also be stored on a disk drive or other storage medium (not shown) within mobile device 200.

Applications 242 may include computer executable instructions which, when executed by mobile device 200, provide a plurality of services, including contact managers, task managers, calendars, games, VOIP applications, transcoders, database programs, word processing programs, security applications, spreadsheet programs, and so forth. Applications 242 generally include a messaging client 243 that causes mobile device 200 to transmit, receive, and/or otherwise process messages (e.g., SMS, MMS, IM, email, and/or other messages), audio, video, and enable telecommunication with another user of another client device.

Another example of application programs includes a browser 245, which may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, messaging client 243 or browser 245 may be configured to enable access to a search application, such as might be available through search server 106 and/or content server 107 of FIG. 1. In one embodiment, a user of mobile device 200 may input to the search application a variety of search terms for use in obtaining a search results. Mobile device 200 may also provide location information, or information useable in determining its physical location. Such information, may, in one embodiment, be useable to automatically (e.g., transparent to a user input) modify the search query.

Illustrative Server Environment

Figure 3:
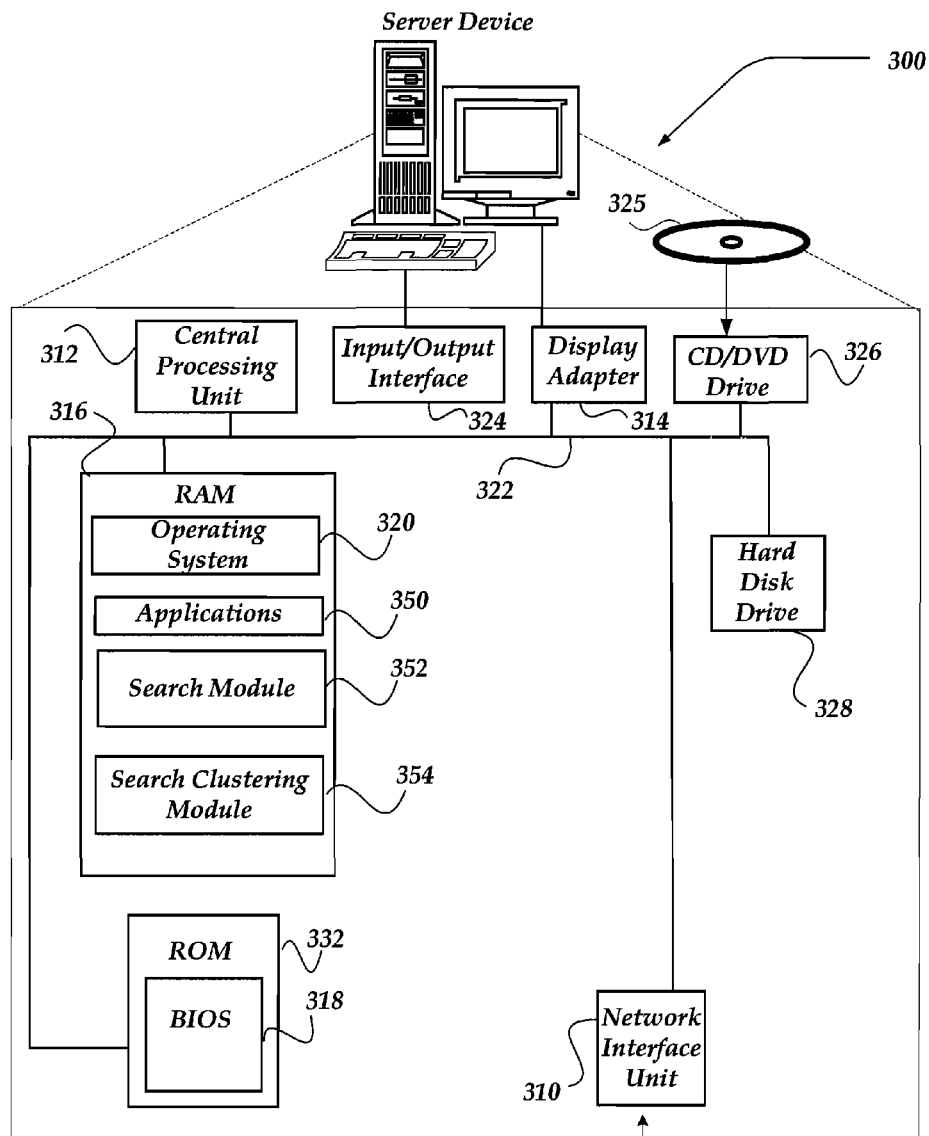
FIG. 3 shows one embodiment of a server device that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may represent, for example, search server 106 and/or content server 107 of FIG. 1.

Server device 300 includes a central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 318 is also provided for controlling the low-level operation of server device 300. As illustrated in FIG. 3, server device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include SMS message servers, IM message servers, email servers, transcoders, schedulers, calendars, database programs, word processing programs, HTTP programs, customizable user interface programs, IPSec applications, encryption programs, security programs, VPN programs, account management and so forth. A search module 352 and/or a search categorizing module 354 may also be included as an application program within applications 350 or as a separate application.

Search module 352 is configured to receive search terms from client devices, determine other search parameters, perform searches of data sources, provide search results, and perform other search related operations. Search categorizing module 354 may be part of, or separate from search module 352. Search categorizing module 354 is configured to organize search results into groups and rank the groups of results. Search module 352 and/or search categorizing module 354 may employ a process substantially similar to that described below or described in a commonly assigned U.S. patent application Ser. No. 11/651,102 entitled "Clustered Search Processing," filed on Jan. 5, 2007, the contents of which are hereby incorporated by reference.

Generalized Operation

Figure 4:
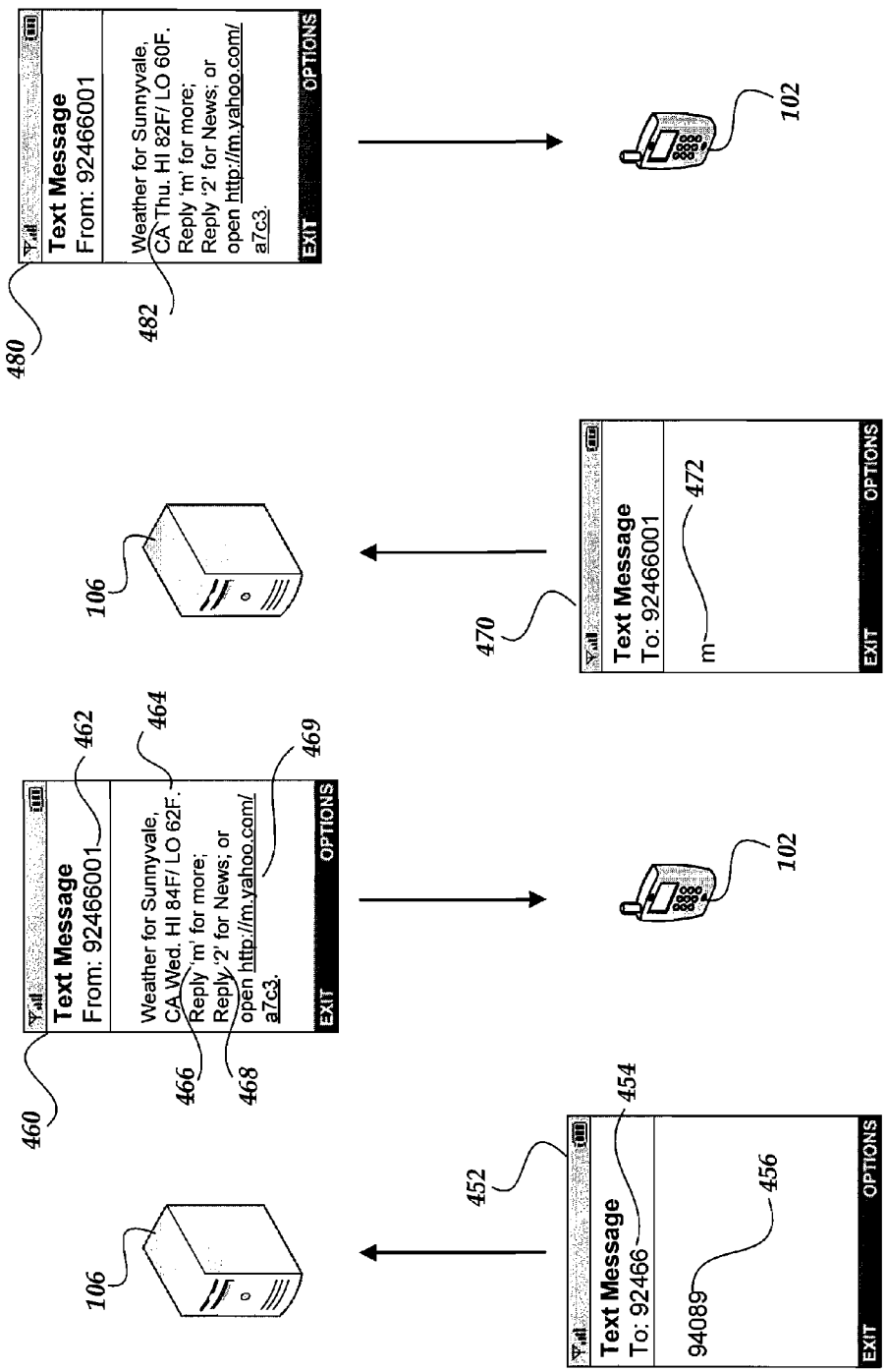
FIG. 4 shows one example of a sequence of search request inputs and result outputs through a text messaging system.
Figure 5:
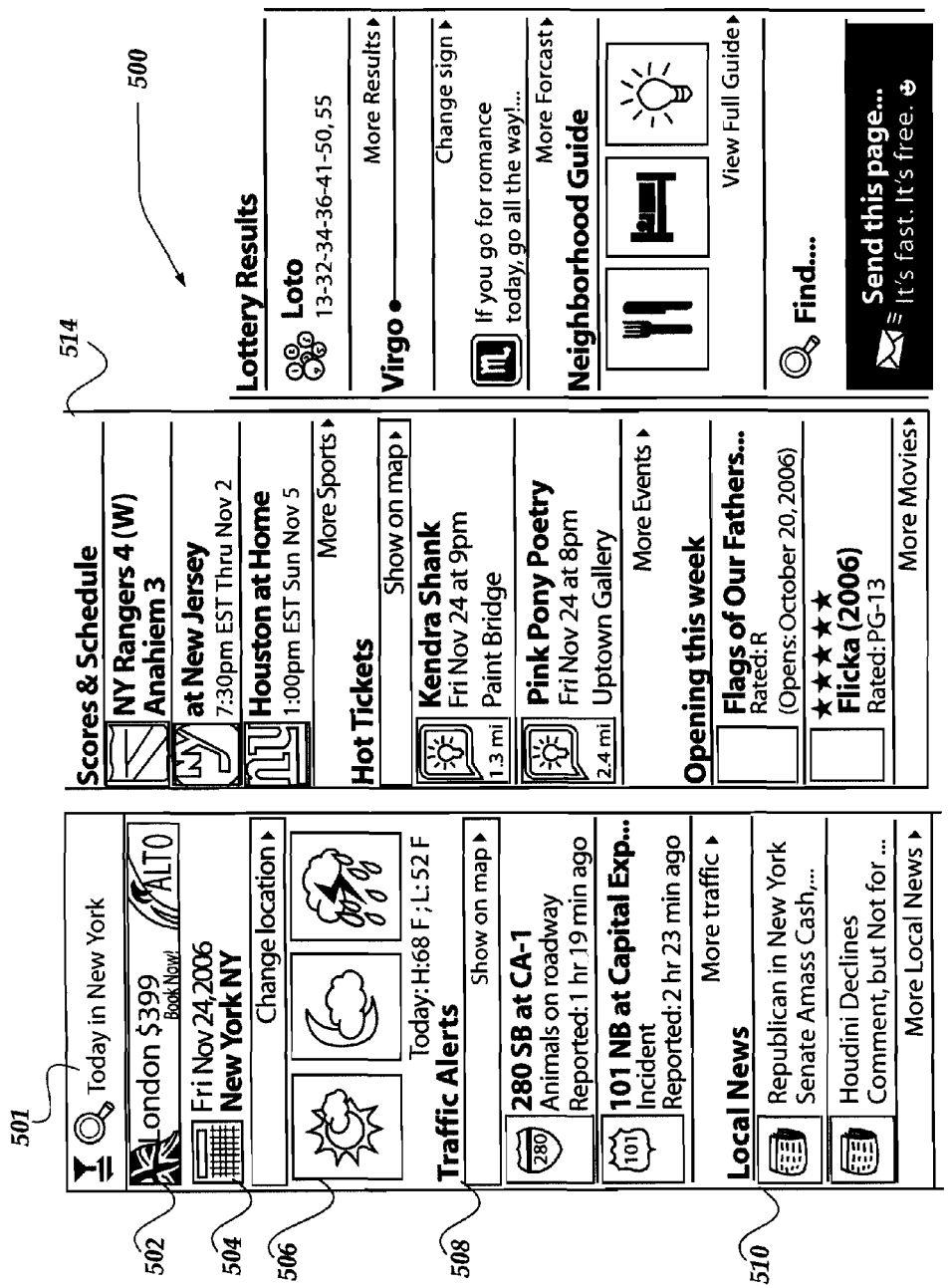
FIG. 5 shows one example of a categorized search results web page for display in a browser on a mobile device.
Figure 6:
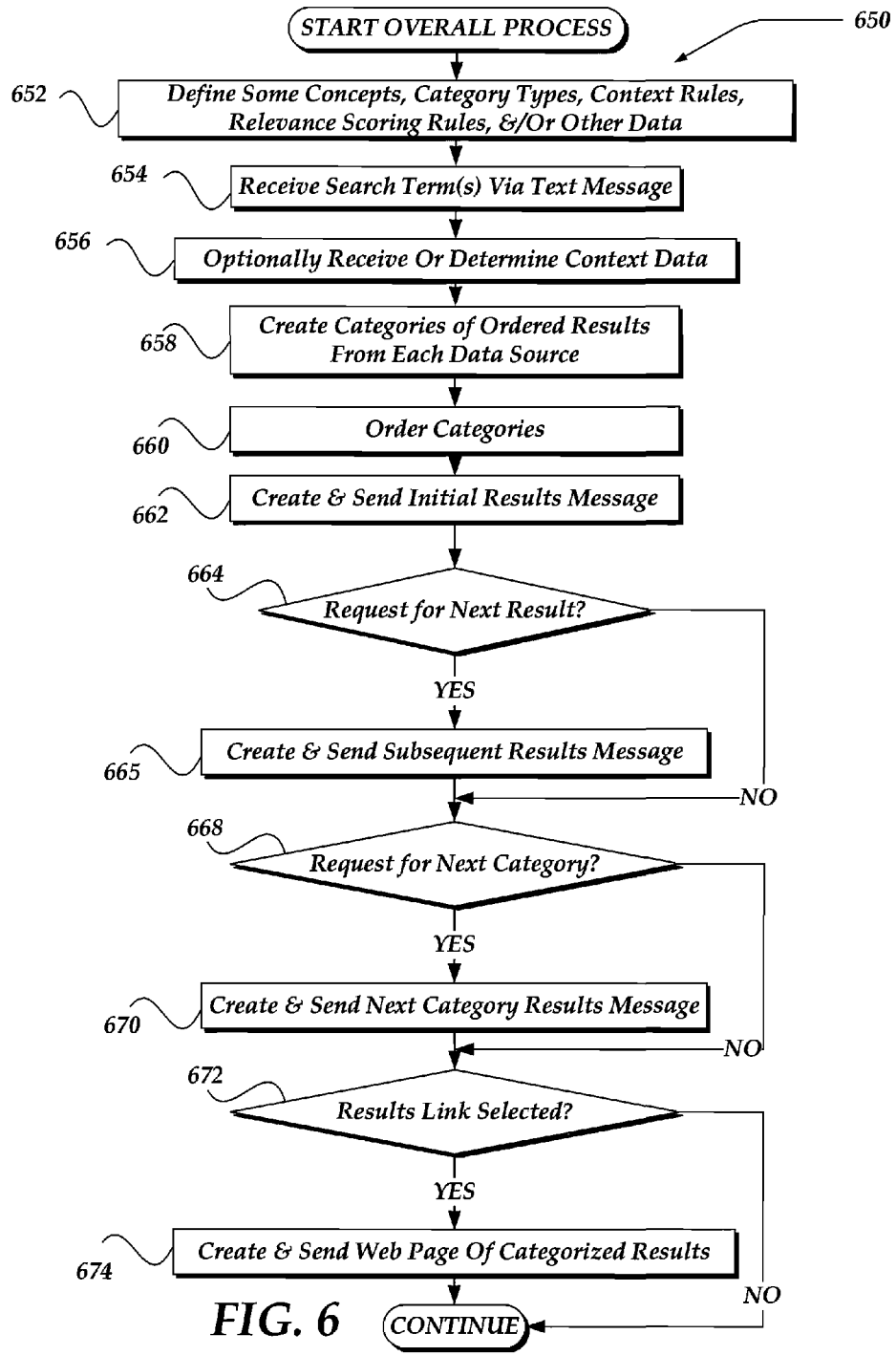
FIG. 6 illustrates a logical flow diagram generally showing one embodiment of an overall process for obtaining search results through a text messaging system.

The operation of certain aspects of the invention will now be described with respect to FIGS. 4-6 FIG. 4 is one example of a sequence of search request inputs and result outputs through a text messaging system. In this example, a user of a mobile device prepares a search request message 452, such as an SMS message, IM, or the like. The search request message includes a target search service identifier 454, such as a short code, telephone number, IP address, user identifier, or the like. The user may manually enter the target search service identifier, select it from a contact list, have it automatically entered by selecting a search type of message, or other technique. The search request also includes one or more search terms 456. In this example, search term 456 is a zip code. The user submits the search request message 452 to search server 106. Messages sent from the mobile device are sometimes referred to as a mobile originating (MO) messages.

The search server evaluates the search term, optionally using other information that may likely be relevant to the user's search request. For example, the search server may factor into its evaluation the fact that the search request came from an SMS message. With the user's permission, the search server may also use the geographic location of the user's mobile device, the user's history of searches, the user's prior behaviors in electronic communications with the mobile device or other devices, the user's predefined or aggregated profile information, or the like. Based on the submitted term(s), the search server determines whether any higher level concepts can be identified. If so, the search server performs a search of one or more concept-specific data sources. If the other information is available, the search server performs a search of one or more context-specific data sources. In addition, or otherwise, the search server performs a search of non-specific data sources. The search server categorizes search results into categories. Within each category, the search server ranks the results based on relevance weighting factors, filtering, or other ranking techniques. The results within a category are evaluated to determine a category score. All of the categories are then ranked based on the scoring determined for each category. Example categories include, weather, local information, news, financial information, show times, sports information, product information, advertisements, horoscopes, nearby wireless access points, or other topics of information.

The search server, or an associated messaging server, creates an initial results message 460, such as an SMS message, IM, or the like. The initial results message includes a results source identifier 462, such as a short code, a short code with an extension, a telephone number, an IP address, a results source identifier, or the like. The initial results message also includes a first search result 464. In this example, the search system determined that the most relevant category of information to this user is weather information associated with the submitted zip code. Within this category, the most relevant search result is the current weather information associated with the submitted zip code. Thus, for this user, first search result 464 comprises current weather content for the submitted zip code.

To access additional results within the same category of search results, the text message indicates that the user may enter a next result command 466. In this example, the text message includes an instruction for the user to send a reply message with the letter "m" in the reply message, to obtain more search results in the same category of search results. In another embodiment, another code, such as "m3" may be used to prefetch the next three search results in the same category, or to obtain the third search result in the same category.

To access additional results in a next most relevant category of search results, the text message indicates that the user may enter another category command 468. In this example, the text message includes an instruction for the user to send a reply message with the number "2" in the reply message, to obtain search results in a different category of search results. The number "2" may correspond to each sequentially next category, or may specify the particular category that has the second highest rank. Additional numbers, or other codes, could be used to specify particular other categories. For example, the numbers "3," "4," "5," etc. could be specified in a sequence of messages or could be specified in any order.

To access search results for display through a browser, the text message indicates that the user may select a results link 469. The results link may comprise a shortened URL that encodes a full URL. Selecting the link may automatically open a browser on the mobile device. Alternatively, or in addition, the user may copy and paste the results link, or type in the results link into a browser. Even for mobile devices that have browser capability, it may be useful to quickly submit a search request through the text messaging client, and select the results link. This may be faster or easier than manually opening the browser and navigating to a search page to perform searching. Selecting a results link in the text message may provide quick access to multiple categories of results. Alternatively, the results link may provide quick access to the most relevant result, which may include a link to a subsequent result and/or other categories of results.

To continue the example shown in FIG. 4, the search server transmits initial results message 460 to mobile device 102 for display to the user. Messages sent to a mobile device are sometimes referred to as a mobile terminating (MT) messages. In this example, the user prepares a reply message 470 that is addressed to the results source identifier 462, such as a short code with an extension. The search server saves an association between the results source code identifier, the mobile device identifier (e.g., phone number), and the search query to enable subsequent search processing based on reply messages. Reply message 470 includes only the letter "m" in the body of the message, indicating that the user desires the next search result in the same category. The user submits reply message 470 to search server 106. The letter "m" is associated with the results source code identifier, the mobile device identifier, and the search query, so the search server can access the proper search results. Because of this association, a user may perform multiple different queries, and still only need to enter the letter "m" in each reply. The search server will determine the proper search results to access for each reply message. Some limitation may apply if an insufficient number of short code extensions are available.

In another embodiment, the user may submit an additional search term in the reply message rather than a navigation command to get other existing search results. For example, the user may submit a reply message that includes the word "news." The search server would not recognize this term as a command for alternate existing search results, so the search server would interpret this term as an additional search term associated with the results source code identifier, the mobile device identifier, and the search query. Accordingly, the search server could perform a new search with the combination of search terms "news 94089." Alternatively, the server could search within the existing results based on the combination of search terms. Similarly, if the user adds multiple search terms in a reply message, the new search terms would be combined with the previously submitted search term. Alternatively, the user can submit a sequence of reply messages with an additional search term in each message. The user can start a new search by submitting a new search request message rather than replying to a results message.

The search server accesses the next most relevant search result and prepares a subsequent results message 480. The subsequent results message includes subsequent search result 482, which is the next day's weather, in this case. The search server then transmits the subsequent results message to mobile device 102.

Multiple search results within a category are generally provided in multiple text messages. Multiple text messages may be sent one at a time, or in groups to reduce transmissions. The mobile device may buffer the subsequent messages for quick display. Once all of the results within a category are exhausted, the text message may not include a next result command, but may include one or more backward navigation commands to return to previous results. In one embodiment, each results message is the same form of message as the search request message. A results message is also generally directed to the same mobile device that sent the search request message, although it could be directed to a different device identified by the user. In another embodiment, the results message is a different form of message from the search request message. The results message may be directed to the same or a different device identified by the user.

FIG. 5 shows one example of a search results page 500 for display in a browser, generated by selecting a results link in a text message. In this example, the search results correspond to a search term 501 that is less intuitively related to concepts for which a user would likely want search results. The search term "today," by itself, may not immediately suggest certain data types of search results that a user probably desires. This search term may indicate a concept of a newspaper title, a morning television show, or other unrelated concept. In this case, contextual information, such as the location of the mobile device, may provide a better indication of the user's intent. Thus, context information may be given more weight to determine which data sources to search and how to category and rank the search results. If the mobile device is in New York City, and the user enters the search term "today," the user is likely to be searching for information relevant to daily life in the city.

Such information may include content related to this city on the current day. For example, date content 504 may provide the current date and enable the user to access a calendar. Similarly, whether or information 506 may display current and forecasts weather conditions in the city. One or more advertisements 502 may also be included. Each of these content items may be obtained from a specialized data source or from an individual data source in the same manner that categories of search results are obtained. This content category, or each content item, can also be ranked relative to other categories as if the content category or content item were just another category among the plurality of categories of search results. In this case, the content information may be considered the first ranked category. A traffic alerts category 508 would be considered the second ranked category. Similarly, local news category 510 would be the third ranked category, sports category 514 would be the fourth ranked category, and so on. The categories of search results may not have data types that are intuitively associated with the search term, but contextual data can be used to obtain and rank categories of relevant search results.

FIG. 6 illustrates a logical flow diagram generally showing one embodiment of an overall process 650 for providing categories of search results and/or content via text messaging. The process may be performed by a server, a combination of servers, a standalone computing device, and/or other configurations of software modules and/or computing devices. To simplify the discussion, the following embodiment is described in terms of a single server in communication with a single mobile client device. At an operation 652, a human administrator may predefined certain concepts, category types, data types, concept processing rules, context rules, relevance scoring rules, and/or other information that may be used to determine data sources, rank search results, rank categories of search results, add content, determine user preferences, determine user behaviors, and/or perform other operations. Alternatively, or in addition, automated analyses can be performed to determine one or more of the above information types, operational rules, and/or other data. For example, analysis can be performed on aggregated data, such as users' click streams, to determine factors that may be used in determining search resources or ranking information. In another embodiment, no such preprocessing is performed.

At an operation 654, the server receives one or more search terms from the mobile device via a text message. To simplify the discussion, a single search term will be assumed. Iterative processing and/or other logic can be used in alternate embodiments. The server may also receive, or obtain, context data at an operation 656. For example, the server may check a user's current location, a current application running on the mobile device, the mobile device profile data, online profile data that is associated with the mobile device, for preferences, behaviors, past purchases, social networking relationships, and/or other user-specific data. Similarly, the server may obtain or calculate aggregated data from click stream analyses and/or other statistical analyses. The contextual information can be used to adjust default weighting multipliers prior to and/or during search processing. In another embodiment, no contextual data is received or determined. Some additional examples of contexts may include, but are not limited to:

tracked behavior of a user (e.g. purchase history, number of searches)

user-specific data (e.g. demographic data such as gender)

time of day at the time of query time zone of the user search query characteristics (e.g. language, length of query, media type)

data plan of the device or user device capabilities or characteristics (e.g. screen size)

user expressed preferences proximity (e.g. to other devices or other users)

direction of the device (e.g. device is facing north)

movement of the device (e.g. device is going north, device is moving at 10 mph)

tracked behavior or other context of users related to user initiating search;

social network (e.g. user A's friends search for sports, so sports are more relevant for user A)

network characteristics (e.g. speed)

content owned by the user or on a device used by the user, which can be, but does not have to be the same as the mobile device (e.g. user has a document on their PC relevant to a search done on the mobile device)

The server determines whether any known concepts are identified from the submitted search term. The server may perform a lookup operation for concepts associated with the search term, or may perform other interpretations, such as natural language processing, to determine concepts. Concepts generally identify categories of information related to the search term. For example, the search term "Chicago" is related to the concept of a city and the concept of a play. As another example, the search term "Chicago pizza" is related to the concept of a style of pizza and the concept of food in the city of Chicago. Each concept may be associated with one or more particular data sources. For instance, play or movie schedules for local theaters may be in specific data sources that would not normally be searched unless it is determined that the user intends the search term to be associated with a play or movie. If the server identifies any concepts from the search term, the server searches corresponding concept-specific data sources. The search results from each concept-specific data source generally comprises a category of search results. The category type of a category may be the same as the data type or a custom category type of multiple data types.

If context data is available, the server looks up or determines associations between the context data and context-specific data sources. The server searches the associated context-specific data sources. The search results from each context-specific data source comprises another category of search results. As above, a context-specific data source may include a single data type of data, such as all restaurant listings within a certain radius of the mobile device's current location. Alternatively, a context-specific data source may comprise multiple data sources with the same or differing data types. Accordingly, the category type of a category may be the same as the data type or a custom category type of multiple data types.

Nonspecific data sources may comprise data that will always be searched, such as web page indices, news data, images, shopping data, and the like. At an operation 658, the server orders the results in each category of search results obtained from each data source. The search results within a category are generally rank based on relevance of the search results to the search term. A number of techniques may be used to rank the search results within a category. Weighting factors, rules, and/or other processing may utilize aggregate click stream data, users specific click stream data, user behavior information, and/or other information. In some cases, special categories are populated with search results from multiple data sources and ranked.

The server determines a score for each category as a whole. The server may determine a category score with relevance scores of the search results within the category. For example, the server may determine a weighted average based on a cumulative score of the relevance scores and based on a predefined, or dynamically determined, factor. Each category score may be modified based on concepts and or context data. All of the categories are then arranged in an order at an operation 660, based on the category scores. Additional content, such as advertising, and/or other content may be added to the search results.

At an operation 662, the server creates an initial results message with the most relevant results from the highest ordered category. The server may limit the results information within the text message based on message size limits, such as a limited number of characters required by an SMS protocol. The server also inserts the next result command, other category command, and results link. The server then addresses and sends the message to the requesting mobile device.

At a decision operation 664, the server detects whether it received a text message requesting a next result in the same category. If a next result message is received, the server creates and sends a subsequent results message, at an operation 665. Similarly, at a decision operation 668, the server detects whether it received a text message requesting an other category result. If an other category message is received, the server accesses the most relevant result from the next category, or the other category number specified. If the other category specifies a particular category, server accesses the most relevant result form the specified category. The server creates and sends an other category results message, at an operation 670.

At a decision operation 672, the server detects whether it received a message indicating that the user selected the results link in one of the results text messages. The server may receive a shortened URL that identifies a full URL, which may include the search term(s) or other parameters. If a results link message is received, the server accesses the relevant results for each category to be displayed in a results web page, such as that shown in FIG. 5. In addition, or alternatively, the server may perform an additional or alternative search to obtain additional or alternative results that are relevant for the context of display in a browser. For example, the server may search for graphics content, advertisements, or other data that was not relevant for display in a text message. At an operation 674, the server creates and sends a results web page. Processing continues by returning to a prior step to await further input, perform prefetching, caching, exiting the search process, or other operations.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method for searching data, comprising:
   receiving from a requesting device over a character-limited text messaging protocol, a search request text message that comprises a first quantity of message characters not greater than a predefined quantity of message characters that are allowed for the character-limited text messaging protocol, and the search request text message includes a search term and an identifier of the requesting device;
   obtaining a plurality of categories of search results, wherein each category is ordered by relevance to at least the search term, and wherein each search result within each category is ordered by relevance to at least the search term; and
   transmitting to the requesting device over the character-limited text messaging protocol, an initial result text message that comprises a second quantity of message characters not greater than the predefined quantity of message characters that are allowed for the character-limited text messaging protocol, and wherein the initial result text message includes:
   a most relevant search result of a most relevant category;
   a user instruction for requesting a subsequent result text message for a next most relevant search result of either the most relevant category or another category; and
   a selectable link to a web page of the plurality of categories of search results.

2. The method of claim 1, further comprising:
   receiving from the requesting device, a subsequent request text message that requests the subsequent result text message; and
   transmitting to the requesting device, the subsequent result text message with a subsequent search result.

3. The method of claim 2, wherein the subsequent search result comprises one of the following:
   another search result of the most relevant category; and
   a first search result of a second most relevant category.

4. The method of claim 1, further comprising:
   obtaining context data associated with the requesting device;
   determining an additional search term based on the context data; and
   obtaining the plurality of categories of search results based on the search term and the additional search term.

5. The method of claim 1, further comprising:
   obtaining context data associated with the requesting device;
   ordering each search result with each category by relevance to the search term and the context data; and
   ordering each category by relevance to the search term and the context data.

6. The method of claim 1, further comprising:
   analyzing a plurality of user click streams; and
   defining each of the categories based on the plurality of user click streams prior to obtaining the plurality of categories of search results.

7. The method of claim 1, wherein each category includes search results from a separate content source.

8. The method of claim 1, further comprising:
   receiving from the requesting device, a indication that the selectable link was selected, wherein selectable text of the selectable link comprises a quantity of characters less than the predefined quantity of message characters that are allowed for the character-limited messaging protocol; and
   transmitting the web page to the requesting device for rendering the web page with an application that is not limited to the predefined quantity of message characters that are allowed for the character-limited messaging protocol.

9. A computer-readable storage medium having computer-executable instructions for searching data, the computer-executable instructions when installed onto a computing device enable the computing device to perform the operations of claim 1.

10. A server for searching data, comprising:
    a processor;
    a communication interface in communication with the processor and in communication with a client device; and
    a memory in communication with the processor and storing data and instructions that cause the processor to perform a plurality of operations, including:
    receiving from a requesting device over a character-limited text messaging protocol, a search request text message that comprises a first quantity of message characters not greater than a predefined quantity of message characters that are allowed for the character-limited text messaging protocol, and the search request text message includes a search term and an identifier of the requesting device;
    obtaining a plurality of categories of search results, wherein each category is ordered by relevance to at least the search term, and wherein each search result within each category is ordered by relevance to at least the search term; and
    transmitting to the requesting device over the character-limited text messaging protocol, an initial result text message that comprises a second quantity of message characters not greater than the predefined quantity of message characters that are allowed for the character-limited text messaging protocol, and wherein the initial result text message includes:
    a most relevant search result of a most relevant category;
    a user instruction for requesting a subsequent result text message for a next most relevant search result of either the most relevant category or another category; and
    a selectable link to a web page of the plurality of categories of search results.

11. The server of claim 10, wherein the instructions further cause the processor to perform operations of:
    receiving from the requesting device, a subsequent request text message that requests the subsequent result text message; and
    transmitting to the requesting device, the subsequent result text message with a subsequent search result.

12. The server of claim 11, wherein the next most relevant search result comprises one of the following:
   another search result of the most relevant category; and
   a first search result of a second most relevant category.

13. The server of claim 11, wherein the instructions further cause the processor to perform operations of:
   obtaining context data associated with the requesting device;
   ordering each search result with each category by relevance to the search term and the context data; and
   ordering each category by relevance to the search term and the context data.

14. The server of claim 11, wherein the instructions further cause the processor to perform operations of:
   analyzing a plurality of user click streams; and
   defining each of the categories based on the plurality of user click streams prior to obtaining the plurality of categories of search results.

15. A client for enabling a user to search data, comprising:
   a processor;
   a communication interface in communication with the processor and with a search server;
   an input device in communication with the processor and enabling a user to enter data;
   an output device in communication with the processor for outputting data to a user;
   a memory in communication with the processor and storing data and instructions that cause the processor to perform a plurality of operations, including:
   receiving a user input comprising a search term;
   transmitting to the search server over a character-limited text messaging protocol, a search request text message that comprises a first quantity of message characters not greater than a predefined quantity of message characters that are allowed for the character-limited text messaging protocol, and the search request text message includes the search term and a client identifier;
   receiving over the character-limited text messaging protocol, an initial result text message that comprises a second quantity of characters not greater than the predefined quantity of message characters that are allowed for the character-limited messaging protocol, wherein the initial result text message includes:
   a search result from an ordered list of a plurality of categories of search results, wherein each category comprises search results from at least one corresponding data source, and wherein each data source comprises data of a data type different from another data source, and wherein the order list is ordered based on a score for each of the plurality of categories, wherein each score is based on a relevance of each of the plurality of categories to at least the search term;
   a user instruction for requesting a subsequent result text message for a next most relevant search result of either the most relevant category or another category;
   a selectable link to a web page of the plurality of categories of search result; and
   outputting the initial result text message.

16. The client of claim 15, wherein the instructions further cause the processor to perform operations of:
   receiving a second user input for requesting the subsequent result text message;
   transmitting a subsequent request text message that requests the subsequent result text message;
   receiving the subsequent result text message with a subsequent search result; and
   outputting the subsequent result text message.

17. The client of claim 16, wherein the subsequent search result comprises one of the following:
   another search result of the most relevant category; and
   a first search result of a second most relevant category.

18. The client of claim 15, wherein the instructions further cause the processor to perform operations of:
   receiving a selection input, indicating that the selectable link was selected, wherein selectable text of the selectable link comprises a quantity of characters less than the predefined quantity of message characters that are allowed for the character-limited messaging protocol;
   transmitting a link selection message, indicating that the selectable link was selected;
   receiving the web page; and
   rendering the web page with an application that is not limited to the predefined quantity of message characters that are allowed for the character-limited messaging protocol.

19. The client of claim 15, wherein the client is a mobile device, and the search term indicates a location of the client.

20. A system for searching data, comprising:
   a client that performs a plurality of operations, including:
   transmitting over a character-limited text messaging protocol, a search request text message that comprises a first quantity of message characters not greater than a predefined quantity of message characters that are allowed for the character-limited text messaging protocol, and the search request text message includes a search term and an identifier of the client;
   receiving over the character-limited text messaging protocol, an initial result text message that comprises a second quantity of message characters not greater than the predefined quantity of message characters that are allowed for a character-limited messaging protocol;
   a search server in communication with the client, and that performs a plurality of operations, including:
   receiving over the character-limited text messaging protocol, the search request text message from the client;
   obtaining a plurality of categories of search results, wherein each category is ordered by relevance to at least the search term, and wherein each search result within each category is ordered by relevance to at least the search term; and
   transmitting to the requesting device over the character-limited text messaging protocol, the initial result text message, which includes:
   a most relevant search result of a most relevant category;
   a user instruction for requesting a subsequent result text message for a next most relevant search result of either the most relevant category or another category;
   a selectable link to a web page of the plurality of categories of search results; and
   a content server in communication with the search server, and storing content for the search results.

* * * * *